United States Patent [19]
Rosenberg

[11] 3,821,921
[45] July 2, 1974

[54] PROXIMITY DETECTOR FOR NUMERICAL CONTROL SYSTEM

[76] Inventor: Jack Rosenberg, 808 Bienveneda Ave., Pacific Palisades, Calif. 90272

[22] Filed: June 11, 1973

[21] Appl. No.: 368,523

[52] U.S. Cl. .............. 90/11 C, 90/11 E, 90/13 C, 408/10, 82/21 B
[51] Int. Cl. ..................... B23c 9/00, B23b 39/08
[58] Field of Search . 90/11 E, 13 C, 11 C, DIG. 12; 408/3, 10, 11, 16; 82/2 A, 21 B; 340/267 R

[56] References Cited
UNITED STATES PATENTS
3,476,013  11/1969  Zemberry ........................ 408/16
3,527,138  9/1970  Boltz ........................ 90/11 E

*Primary Examiner*—Gil Weidenfeld
*Attorney, Agent, or Firm*—Lindenberg, Freilich, Wasserman, Rosen and Fernandez

[57] ABSTRACT

A method and means for indicating that a tool driven by a numerically controlled spindle is sufficiently close to a workpiece so that the system may be switched from a rapid traverse operation to operation at whatever speed is determined proper for the cutting operation.

5 Claims, 2 Drawing Figures

PROXIMITY DETECTOR FOR NUMERICAL CONTROL SYSTEM

BACKGROUND OF THE INVENTION

When a part programmer programs a tape for cutting a contoured metal part on a machine tool, he tries to program motion between the workpiece and cutting tool so that the total time from start to finish is a minimum. This is done because the cost per unit of time of operating the machine tool, which includes the cost of the operator, is so high that it is most desirable to minimize the time required for performing required cutting operations on a workpiece.

During the time when the cutting tool is in contact with the metal part, and is removing metal, the feedrate, which determines the relative velocity between the cutting tool and the workpiece, is programmed to be high enough to remove metal rapidly, but not higher than a limit beyond which tool damage may occur. There are many intervals of motion in the total path followed by the cutter, in the course of its operations on a workpiece, when the cutter is not in conctact with the workpiece. Often the cutter must go from cutting out a pocket to another location where another pocket is to be cut. However, the cutter must be moved in such a manner as to clear intervening portions of the workpiece, which must be left uncut. Examples of intervening portions are webs, stiffeners, and braces. Motion of the cutter must also avoid all clamps and fixtures used to hold the metal part to the machine tool bed.

When a part programmer is sure that the cutter is far from such items, he programs the relative workpiece and tool motion at a very high feedrate to minimize the time interval when no cutting is being done. Such noncutting feedrates may be 100 to 200 inches per minute, while cutting feedrates may be from 5 to 30 inches per minute. However, because the programmer cannot always anticipate exactly when the tool will contact the metal part, he plays it safe and does not take the chance of scheduling a very high feedrate because an unanticipated plunge into metal at a high rate can quickly break the cutter and possibly damage both the workpiece and the machine tool.

Because of this uncertainty, for a typical part, the cutter is removing metal only about 50 percent of the time that the machine tool is being automatically controlled by the tape. The cutter moves at a low feedrate most of the other 50 percent of the time, which is the time that it moves without performing the cutting operation. If a programmer could be sure that in approaching the location of a cut he could obtain a signal when the cutter is far enough away from a metal part so that it could slow down to a low cutting feedrate before touching the part, he could call for a very high feedrate during all noncutting motions. If some safe way could be devised to advance the feedrate to say 150 inches per minute automatically, whenever a cutter is more than 0.1 inch from the part, the total manufacturing time for a workpiece could be reduced by 25 percent or more. Since a machine tool and its numerical control are very expensive pieces of capital equipment, costing from $300,000 to $1,000,000 per system, a reduction in manufacturing time of 25 percent would be of enormous value.

Prior art attempts at building a circuit to detect when a cutter is not in contact with the metal workpiece have included measuring the ohmic resistance between an insulated cutter and the metal workpiece. Whenever the cutter is in contact with the workpiece, the resistance is less than 1 ohm, so that if a value greater than 1 ohm is indicated, the feedrate can be automatically advanced to 150 inches per minute. As soon as the resistance falls to 1 ohm or less, the ohmmeter can reduce the feedrate to that programmed in the numerical control tape. The trouble with that system is that the machine tool cannot instantaneously change its velocity between the rapid traverse velocity and the cutting velocity and so this detection system cannot be used because the risk of damage is too high.

Another attempt at proximity detection has been made using an insulated cutting tool as a probe of a capacitance bridge. A certain capacitance is established between the insulated cutting tool and the workpiece and when this increases above a predetermined value, as detected by a bridge, the velocity of the system is slowed from the rapid traverse velocity to the cutting velocity. The trouble with such a system is that it is neither sensitive nor stable enough. When a part is manufactured, a stream of liquid is poured on the cutter from a nearby reservoir at all times to cool the cutter and prevent damage and short life due to overheating from the cutting action. Such coolant fluids are usually mixtures of water and water soluble oils and the flow of coolant on the tool causes a greater change in capacitance than proximity to the workpiece. Therefore, the necessary coolant contaminates the capacitance probe.

OBJECTS AND SUMMARY OF THE INVENTION

It is an object of this invention to provide a system for accurately detecting when a tool is close to a workpiece.

It is another object of this invention to provide a reliable proximity detecting system which indicates when a cutting tool is sufficiently close to a workpiece so that enough distance is allotted for the relative motion of these elements to be reduced from the rapid traverse mode to the cutting mode.

Yet another object of the present invention is the provision of a novel and useful proximity detection system for use with a numerically controlled machine tool.

The foregoing and other objects of the invention are achieved in an arrangement wherein the resistance between an insulated cutting tool and the workpiece is measured in the presence of an ordinary coolant which is poured on the tip of the tool. The rotating tool spreads a stream of the coolant around the tool. When the cutting tool is in excess of a distance on the order of a one-fourth inch away from the workpiece, the resistance between the two is an excess of 100,000 ohms. At a distance on the order of 0.250 inch, the stream effectively bridges the distance between the cutting tool and the workpiece with a sufficient density so that there is a rather abrupt drop in resistance which has been measured, to a value of 10,000 ohms or less. Such a resistance drop can be detected and used to automatically reduce the feedrate from a rapid traverse value to a cutting value. Furthermore, the distance between the cutting tool and the workpiece at which such drop in resistance is detected, is amply sufficient to enable the reduction of the relative cutting tool to workpiece velocity to the programmed cutting rate.

The novel features of the invention are set forth with particularity in the appended claims. The invention will best be understood from the following description when read in conjunction with the accompanying drawings.

DESCRIPTION OF THE PREFERRED EMBODIMENTS

The drawings herein show only those portions of a numerically controlled machine tool system with which this invention is concerned.

Figure 1:
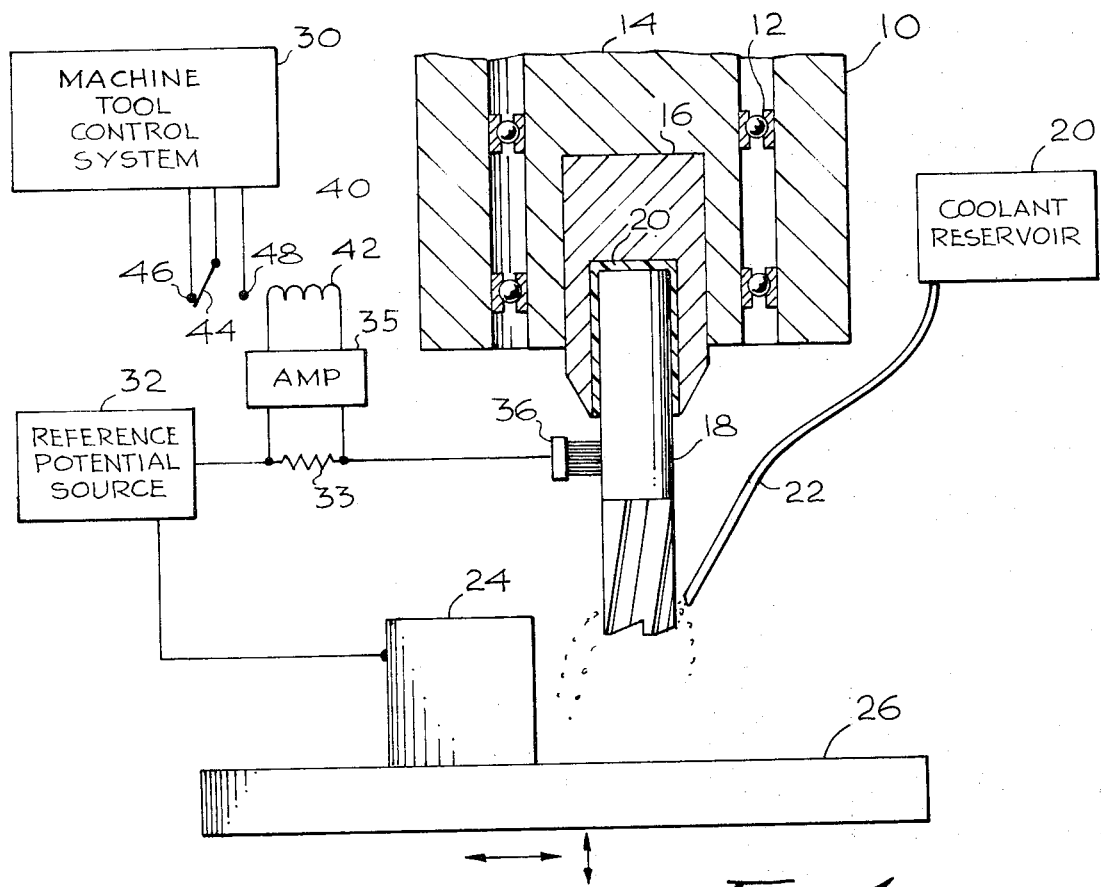
FIG. 1 is a schematic drawing of the region of a numerically controlled machine tool adjacent to the cutting tool and workpiece, and the arrangement required in accordance with this invention for detecting cutting tool and workpiece proximity.

In FIG. 1, there is shown schematically and in cross-section, a section of a spindle housing 10 which holds, in bearings 12, a rotating spindle, 14. The spindle holds a collet 16. A cutting tool 18, has an insulating material wrap 20 around one end thereof, which is inserted into the collet to be held thereby. The insulating wrap may be a piece of Mylar, for example, or any other thin flexible insulating material. A coolant reservoir 20, holds a supply of coolant which, when the spindle is rotated, flows through a tube 22, onto the tip of the cutting tool 18. A workpiece 24, is clamped to a machine tool table 26.

Control of the machine tool is performed by the machine tool control system 30, which has programmed therein the usual information required for a machine tool to perform its cutting operations, except that, in accordance with this invention, provision is made to provide signals which enable the control system 30 to change the rapid traverse feedrate to a cutting operation feedrate whenever this invention provides an indication that the cutting tool is proximal to the workpiece, and to change cutting operation feedrate to rapid traverse feedrate whenever this invention provides an indication that the cutting tool is no longer proximal to the workpiece.

In accordance with this invention, a reference potential source 32 is connected to the workpiece 24 and is connected to a wire brush 36 through a resistor 33. An amplifier 35 has its input connected across the resistor 33 and its output connected to the solenoid 42 of a single pole double throw relay 40. The amplifier senses when a voltage drop across the resistor exceeds a predetermined level at which time it can apply enough current to the solenoid to cause relay 40 to become operative. The swinging contact 44 of the relay makes contact with the terminal 46 when the relay is inoperative. This occurs when the spacing between the cutting tool and the workpiece is such that the resistance between the cutting tool and workpiece is so high that an insufficient current flows through the resistor 33, and therefore, the voltage drop across it is so low that amplifier output cannot render the relay operative. The two contacts 46, 48 as well as the swinging arm 44 of the relay are connected to the machine tool control system. In the position for the relay swinging arm and contact shown in FIG. 1, the machine tool control signal can either signal a rapid traverse feedrate or whatever feedrate a programmer desires while the tool and workpiece are out of contact with one another and more than a predetermined distance away from one another.

Figure 2:
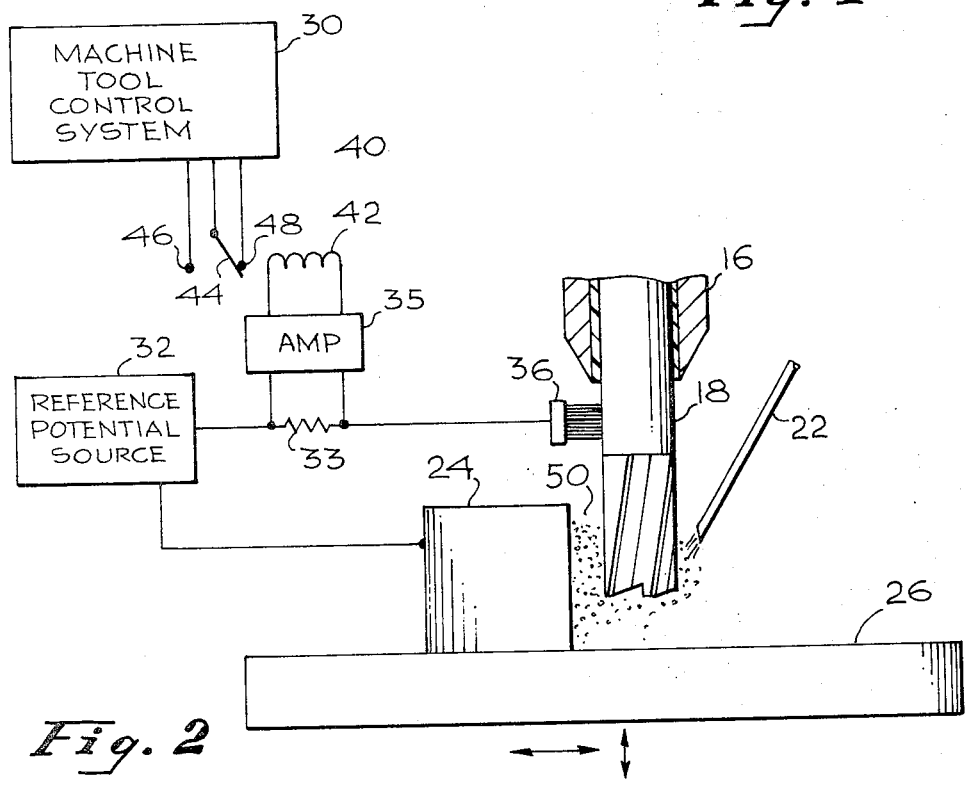
FIG. 2 illustrates the relative positions of a cutting tool and workpiece when the coolant spray bridges the distance between them whereby the resistance being measured is reduced.

FIG. 2 is a simplified representation of FIG. 1, and illustrates what happens when the cutting tool is so close to the workpiece that the liquid spray, 50, from the workpiece effectively bridges the gap between them, whereby the resistance therebetween is reduced to a value such that a sufficient current flows through resistor 33 to enable the amplifier 35 to render the relay 40 operative. At this time, the swinger of arm 44 closes onto terminal 48. This sends a signal to the machine tool control system informing it to reduce the feedrate from rapid traverse to cutting feedrate. As indicated, this marked dropping of resistance occurs when the cutting tool is on the order of one-fourth inch away from the workpiece. The spray or stream not only flies out sidewards to bridge the space between the cutting tool and workpiece when the cutting tool is adjacent to a side of the workpiece, but also, drops from the bottom of the workpiece so that when the tool is above the top of the workpiece, an indication of proximity is provided by the spray from the side and the bottom of the tool. This spray is sufficiently dense when the tool is close to the top of the workpiece, also on the order of 0.25 inch, to provide the required resistance drop.

Control over the resistance of the liquid can be achieved by determining the composition of the water soluble oil which is mixed with the water, or the concentration of the oil and water, or even by introducing desired amounts of salt in the coolant solution. Also, the speed of rotation of the cutting tool and the rate of flow of the liquid through the nozzle 22 determines the density of the spray which bridges the space between the cutting tool and workpiece and therefore also determines the resistance therebetween. All of these parameters can be varied to obtain a desired resistance for a predetermined distance between cutting tool and workpiece at which relay operation occurs to produce the change in velocity from rapid traverse to cutting velocity or at which the relay becomes inoperative, to signal rapid traverse velocity may be used.

There has accordingly been described and shown herein a novel and useful arrangement for detecting when a cutting tool reaches a predetermined distance from a workpiece whereby the machine tool control system can be signaled to switch from a rapid traverse velocity to a cutting velocity or vice versa. It should be appreciated that while the embodiment of the invention illustrates a relay for detecting the proximity of cutting tool and workpiece, this is by way of illustration only and should not be construed as a limitation upon the invention, since other well known detection systems, such as voltage comparators, solid-state relay devices such as silicon controlled rectifiers, etc., may be employed for detecting and signaling a resistance change without deviating from the spirit and scope of this invention.

What is claimed is:

1. In a numerically controlled machine tool system of the type wherein there is included a control means for moving a rotating cutting tool relative to a workpiece on a table at a first velocity when the cutting tool and workpiece are not in engagement and at a second velocity when the cutting tool is in engagement with the workpiece and cutting metal, and said first velocity is greater than said second velocity, and a liquid is poured on the cutting end of said cutting tool while it is rotating, wherein the improvement comprises:

means for detecting when said cutting tool is a predetermined distance from said workpiece comprising, means for applying a predetermined voltage between said cutting tool and said workpiece, and means responsive to a change in the voltage between said cutting tool and said workpiece to indicate that said cutting tool has reached said predetermined distance from said workpiece.

2. Apparatus as recited in claim 1 wherein said cutting tool is insulatingly retained in a collet chuck and said workpiece is insulatingly supported on a table.

3. Apparatus as recited in claim 2 wherein said means responsive to a change in the voltage between said workpiece and cutting tool includes means for signaling said control means that a change in said voltage has occurred to enable it to change the relative velocity between said cutting tool and said workpiece.

4. In a numerically controlled machine tool system wherein a control means controls the velocity of a cutting tool relative to a workpiece, a fluid is directed at the cutting end of said workpiece, and the velocity between said cutting tool and workpiece is a rapid traverse velocity when they are not in contact and a cutting velocity when they are in cutting contact, means for signaling said control means when the distance between said cutting tool and workpiece attains a predetermined value, wherein the improvement comprises a voltage source, means for applying voltage from said source between said cutting tool and workpiece, and means responsive to the voltage applied between said cutting tool and workpiece attaining a predetermined level below the level of the voltage source for signaling said control means that the distance between said tool and workpiece is said predetermined value.

5. The method of determining when a cutting tool which moves relative to a workpiece in a numerically controlled system is within a predetermined distance from said workpiece, including moving said cutting tool relative to the workpiece at a first velocity when the cutting tool and workpiece are not in engagement and at a second velocity when the cutting tool is in engagement with the workpiece and cutting metal applying a liquid to the working tip of said cutting tool, wherein the improvement comprises:

applying a reference voltage between said cutting tool and workpiece, sensing the voltage between said cutting tool and workpiece as they move relative to one another, and providing an indication when the voltage sensed between said cutting tool and workpiece changes to a predetermined amplitude.

* * * * *